July 7, 1925.  
C. SCHENCK  
1,545,168  
BEAM AND ITS METHOD OF MANUFACTURE  
Filed Dec. 4, 1924   4 Sheets-Sheet 1
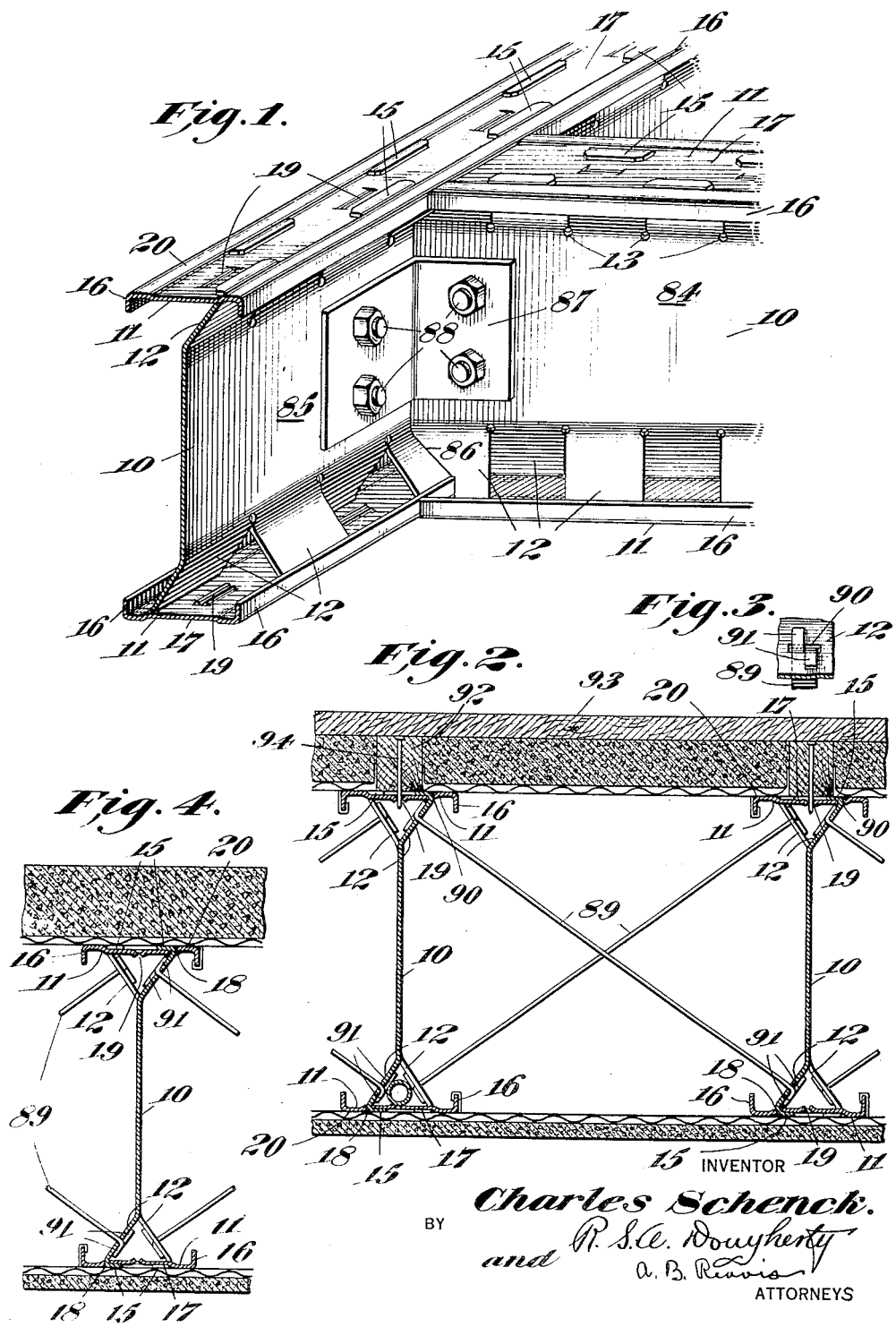
INVENTOR  
Charles Schenck.  
BY  
ATTORNEYS July 7, 1925.                                               1,545,168
C. SCHENCK
BEAM AND ITS METHOD OF MANUFACTURE
Filed Dec. 4, 1924                     4 Sheets-Sheet 2
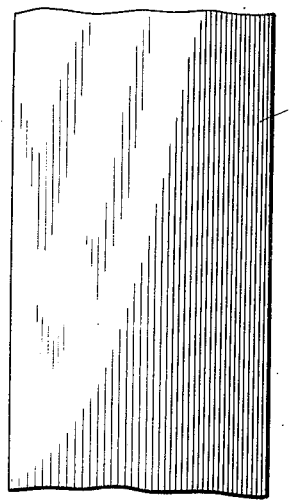
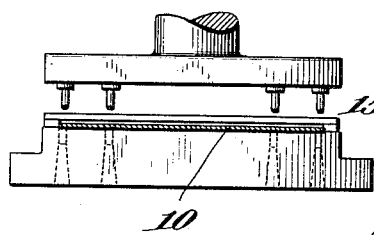
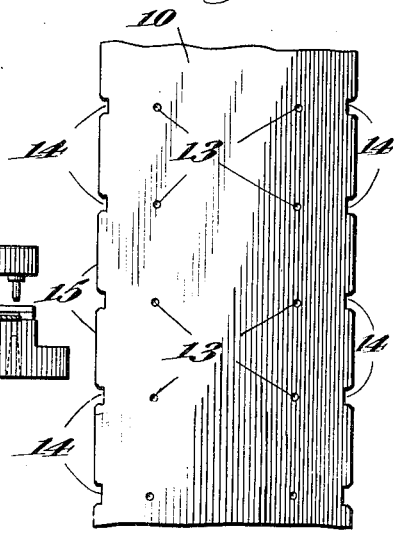
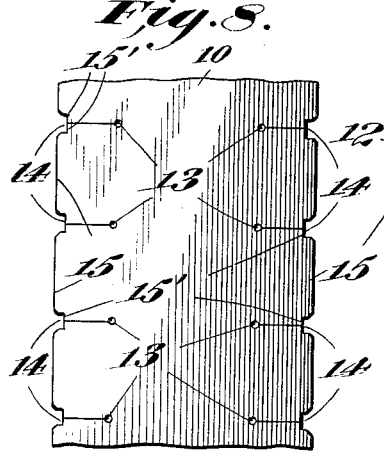
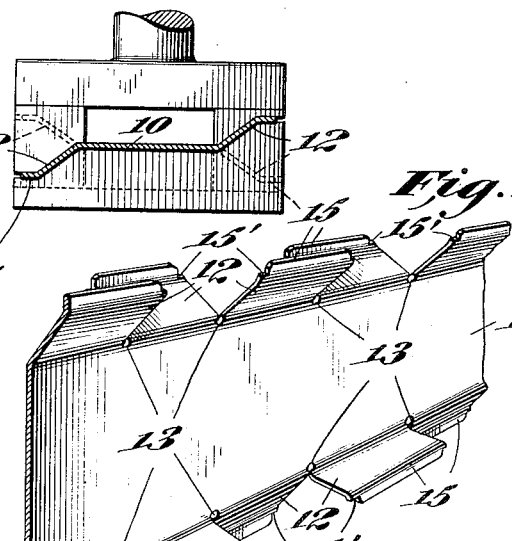
INVENTOR
Charles Schenck.
BY R. S. A. Dougherty
and A. B. Reavis
ATTORNEYS July 7, 1925.  1,545,168
C. SCHENCK
BEAM AND ITS METHOD OF MANUFACTURE
Filed Dec. 4, 1924    4 Sheets-Sheet 3
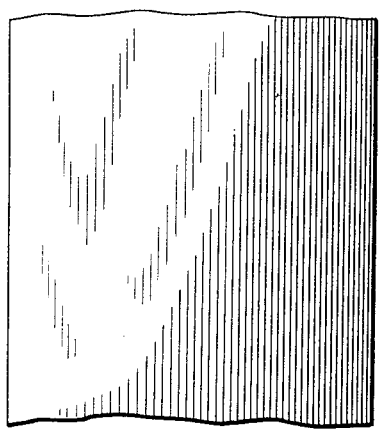
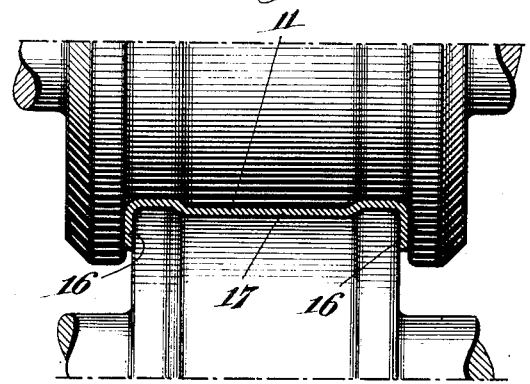
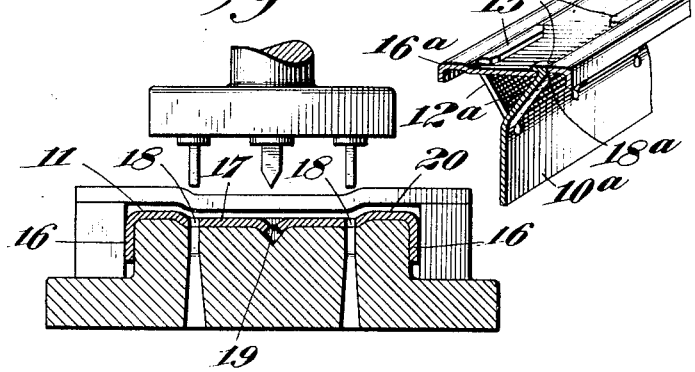
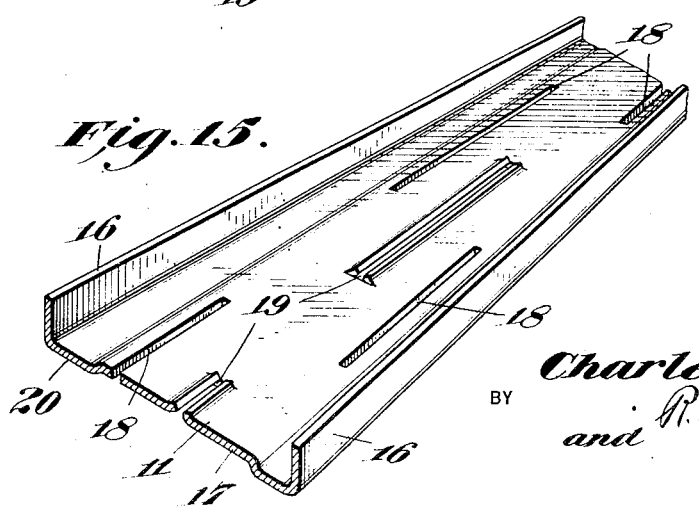
INVENTOR
Charles Schenck.
BY R. S. A. Dougherty
and A. B. Reavis
ATTORNEYS July 7, 1925.
C. SCHENCK
1,545,168
BEAM AND ITS METHOD OF MANUFACTURE
Filed Dec. 4, 1924
4 Sheets-Sheet 4
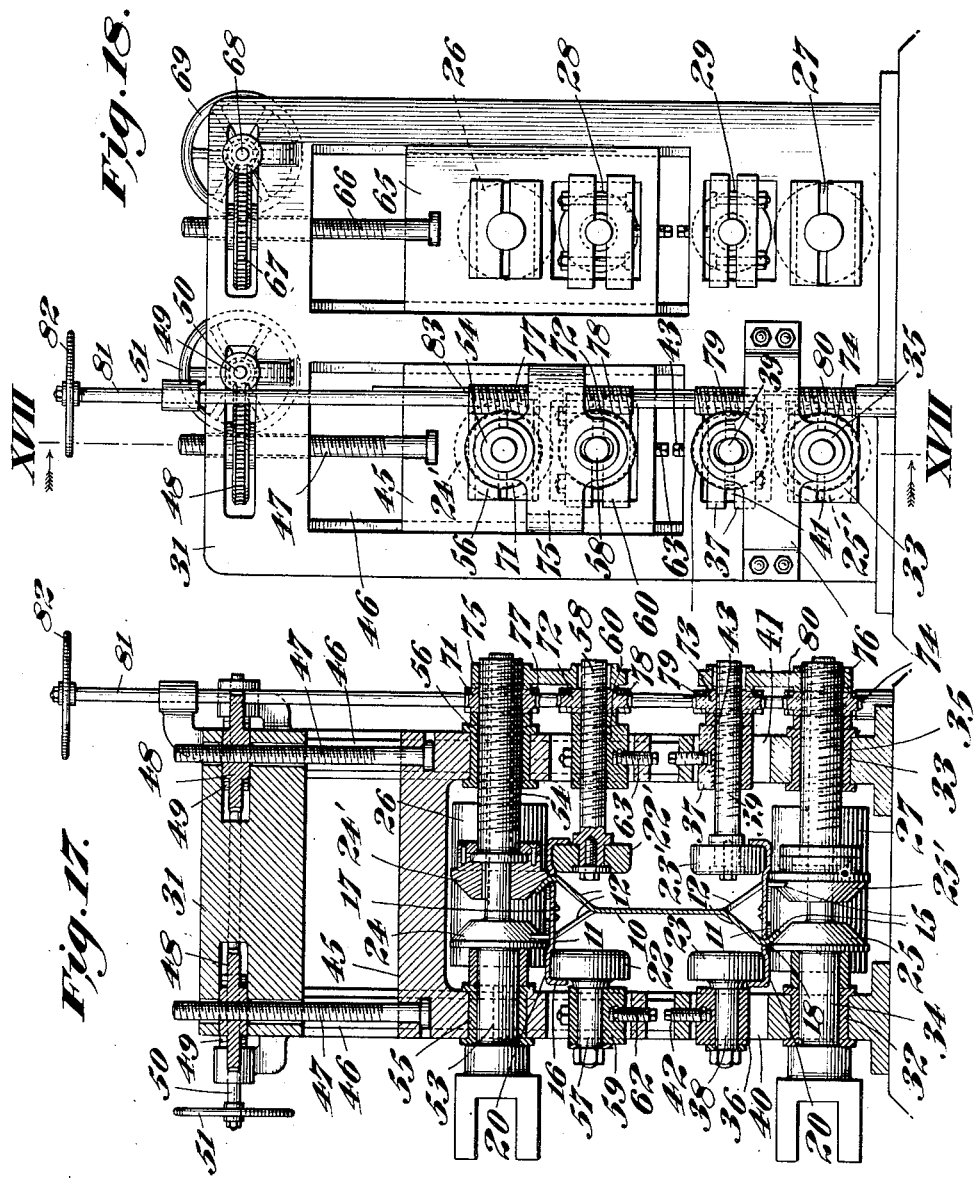
INVENTOR
Charles Schenck.
BY R.S.A. Dougherty
and A. B. Reavis
ATTORNEYS Patented July 7, 1925.

1,545,168

UNITED STATES PATENT OFFICE.

CHARLES SCHENCK, OF BETHLEHEM, PENNSYLVANIA, ASSIGNOR TO BETHLEHEM STEEL COMPANY.

BEAM AND ITS METHOD OF MANUFACTURE.

Application filed December 4, 1924. Serial No. 753,781.

*To all whom it may concern:*

Be it known that I, CHARLES SCHENCK, a citizen of the United States, and residing at Bethlehem, in the county of Northampton and State of Pennsylvania, have invented certain new and useful Improvements in Beams and Their Method of Manufacture, of which the following is a specification.

My invention relates to beam and like structural elements and it has for an object to provide a beam of such a character that it may be readily formed from metallic sheet or plate material by my improved method.

The field of usefulness of my invention is principally that of what is commonly termed "metal lumber", where it is sought to make substitutes for wooden beams or joists and the like out of metal. Rolled sections, such as I- or H-beams, may not be used for this purpose economically save in situations where the loads are especially heavy, the reason for this being that it is not feasible nor practicable to roll sections of this character with webs and flanges of the requisite thinness and with webs of the requisite widths. Accordingly, therefore, I have devised a type of beam, a method for its manufacture, and apparatus for carrying out the method and effecting the manufacture of the beam, whereby a beam of this character, simulating an I-beam in appearance and function, may be readily formed from metallic plate or sheet material. Since a beam of this type may be formed from material of any suitable gage, no limitations are imposed by web and flange thicknesses and webs and beams with webs of any suitable depths may be manufactured.

A further object of my invention is to provide a method for forming the web member and the flange members of a structure of the character referred to so that these parts may be readily assembled and held together in a form resembling standard rolled sections.

A further object of my invention is to provide a structural member of the character referred to in which the web and the flange members are made form light metallic plate material, the web member having lateral tongues which are inclined in opposite directions and which have their outer ends secured to the flange members.

A further object of my invention is to provide a method for the production of fabricated beams and structures from metallic plate material which consists in forming from plates flange members with parallel rows of slots therein, in forming a web member from such plate material with lateral tongues inclined alternately in opposite direction and having tenons at their outer ends, in placing the flange members with the slots thereof engaging the tenons, and in upsetting the tenons externally of the flange member in order to hold the structure together.

A further object of my invention is to provide improved apparatus which shall be peculiarly suitable for the manufacture and assembly of beams or structures of the character referred to.

A further object of my invention is to provide an arrangement of beams of the character referred to in combination with diagonal tension bracing means to constitute a building construction.

A further object of my invention is to provide a beam or structure fabricated from sheet or plate material and which is made up of flange members and a web member, the web member having lateral tongues bent alternately in opposite directions and the tongues being secured to the flange members, and the flange members being slitted between the tongues to provide inwardly-extending clutching lips to serve to clutch nails.

Apparatus made in accordance with my invention is illustrated in the accompanying drawings, forming a part of this application, in which:

Fig. 1 is a perspective view of structural members made in accordance with my invention;

Fig. 2 is a transverse sectional view showing a plurality of my improved beams and bracing members used as a part of a floor construction;

Fig. 3 is a detail view showing the connection of a bracing member with one of the beams;

Fig. 4 is a sectional view similar to Fig. 2 but showing a different floor construction;

Fig. 5 is a detail view of a portion of a web-forming blank;

Fig. 6 shows apparatus for punching apertures and lateral notches in the web-forming blank;

Fig. 7 is a detail view of the web-forming blank after being apertured and notched;

Fig. 8 is a detail view of the web-forming blank after being laterally slitted;

Fig. 9 is a diagrammatic view showing dies for bending lateral tongues of the web-forming blank alternately in opposite directions;

Fig. 10 is a detail perspective view of a blank with bent tongues;

Fig. 11 is a transverse sectional view of the web member shown in Fig. 10;

Fig. 12 is a detail view of a flange-forming blank;

Fig. 13 is a detail view of shaping rolls for the flange forming blank;

Fig. 14 is a diagrammatic view of punching apparatus for slotting and slitting flange members;

Fig. 15 is a detail perspective view of a flange member having slots and slits arranged therein;

Fig. 16 is a transverse sectional view of web and flange members in assembled relation;

Fig. 17 is a transverse sectional view of apparatus for bending down flange tenons;

Fig. 18 is a side elevation of the apparatus shown in Fig. 16; and,

Fig. 19 is a perspective view of a further modified form of my improved beam structure.

Referring now to the drawings for a better understanding of my invention, in Figs. 1, 2, 4 and 16, I show a beam or structural member consisting of a web 10 and flange members 11 made from rolled plate material, the flange and web members being formed separately and then secured together in order to approximate in function and somewhat in appearance the well known type of I- and H-beams. The web and flange members 10 and 11 are secured together by providing the web member 10 with lateral tongues 12 which are bent alternately in opposite directions from the plane of the web member and the tongues 12 are secured, at their outer ends, to the flange members 11. The web member 10 has a solid portion extending normally with respect to a flange member and each of the tongues 12, at one side thereof, defines opposed acute angles with respect to the planes of the normal web portion and of a flange member.

As shown in the drawings, the tongues 12 are provided by slitting the web member 10 and then in bending the material between slits alternately in opposite directions. To this end, referring to Figs. 5 to 10, inclusive, a metal plate suitable for the formation of a web may be punched with apparatus, such as shown in Fig. 6, to provide a blank having parallel rows of apertures 13 and lateral notches 14, pairs of apertures 13 and pairs of notches 14 being transversely aligned, as is shown in Fig. 7. The partially finished web blank shown in Fig. 7 is cut or slitted, as indicated in Fig. 8, the slits joining the apertures 13 and intersecting the notches 14 substantially midway of the latter. The latter operation provides lateral tongues 12 having outer tenons 15, the tongues having shoulders 15' adjacent to the tenons. By providing the apertures 13, the step of slitting is facilitated and tearing of the web is avoided.

A web-forming blank, having the form indicated in Fig. 8, is next passed between bending dies, as indicated in Fig. 9, in order that the tongues 12 may be bent alternately in opposite directions. In addition to inclining the tongues 12 in opposite directions the outer portions of the tongues 12, including the shoulder portions 15' and the tenons 15, are maintained parallel to the intermediate web portions.

The flange members 11 are formed by passing a metal plate, such as indicated in Fig. 12, through shaping rolls, as indicated in Fig. 13, to form lateral angle portions 16 and an intermediate depressed portion 17, these features contributing to the strength and rigidity of the flange member and the flange member having the form of a channel member with its web portion indented as indicated at 17.

The shaped flange blank is next punched with apparatus shown by way of example in Fig. 14, to provide tenon slots 18 and nail slits 19, the tenon slots at opposite sides being staggered and so positioned and of the correct size to fit about the tenons 15 of the tongues 12.

With the completion of the web and of the flange forming members 10 and 11, as indicated in Figs. 10 and 15, the flange-forming members 11 are placed in position with respect to the web-forming member 10 with the tenons of the latter passing through the slots 18. The flange-forming members 11 are so positioned, when assembled, that the angle or flange portions 16 of opposite members extend toward each other and the centrally depressed or channel portions 17 of the flange members also extend toward each other to provide external upper and lower longitudinally extending depressions. The slots 18 and the nail slits 19 are arranged in the material forming the bottom of the depressed or channel portions 17. The channel or indented portions are preferably made of depth equal to the thickness of the web material, so that when the tenons are bent down the outer surfaces thereof will be flush with the outermost surfaces 20 of the flange members.

The operation of bending down the tenons 15 after a pair of opposed flange members 11 and a web member 10 have been assembled is preferably carried out by apparatus such as indicated in Figs. 17 and 18, wherein I show upper and lower pairs of opposed holding rolls 22 and 22' and 23 and 23', respectively, the rolls engaging in the corners joined by the angle portions 16 and being preferably rounded at one side so as to fit between an angle member 16 and a wall defining the channel or depression 17. Arranged above and below the pairs of holding rollers 22 and 22' and 23 and 23' are pairs of beveled face rollers 24 and 24' and 25 and 25' which engage the tenons 15 and bend them over as may be seen from Fig. 16.

After the tenons 15 are bent over by the beveled face rollers, the structure moves between upper and lower flattening rollers 26 and 27, which serve to flatten the bent over tenons 15 into the channel portions 17 of the flange members 11. Supporting rollers, indicated generally at 28 and 29 and which are similar in arrangement, function and mode of operation to the pairs of rollers 22 and 22' and 23 and 23', cooperate to support or hold the beam structure in position while the tenons are being flattened.

In order that the tenon bending machines shown in Figs. 17 and 18 may be adapted to beam structures of varying sizes and in order that adjustments may be made from time to time to keep the various rollers in correct relative positions, I employ adjustable frame structure journal mounts which permit of vertical adjustment of upper groups of rollers with respect to lower groups of rollers. To this end, I show a frame 31 which has bearings 32 and 33 for the shafts 34 and 35 of the bevel rollers 25 and 25', respectively. Supporting bearings 36 and 37 are provided for the shafts 38 and 39 of the supporting rollers 23 and 23', these bearings being adjustable in vertical slots 40 and 41 by screws 42 and 43.

The upper roller assembly comprised by the rollers 22 and 22' and 24 and 24' is carried by a frame 45 which is adjustable vertically in guide slots 46 in the main frame 31, adjustments being made by feed screws 47 which are traversed by worm wheels 48 threaded thereto and which mesh with worms 49 carried by a transverse shaft 50, which is operated by a suitable hand wheel 51.

The bevel rollers 24 and 24' are provided with shafts 53 and 54 mounted in bearings 55 and 56 carried by the frame 45; and the holding rollers 22 and 22' are carried by shafts 57 and 58 mounted in bearings 59 and 60 which are adjustable vertically with respect to the frame leg means of the screws 62 and 63.

From the structure of the tenon bending machine so far described, it will be apparent that the holding rolls 22 and 22' may be adjusted with respect to the bevel rolls 24 and 24' by means of the screws 62 and 63 and that the holding rolls 23 and 23' may be adjusted with respect to the bevel rolls 25 and 25' in order that the flange members 11 may be kept in a desired relative position and in order that the latter may be held in correct positions so that the tenons 15 may be bent over with the shoulders 15' engaging against the inner sides of the flange members 11. After correct individual adjustments of the holding rolls 22 and 22' and 23 and 23' have been made in this manner, the movable frame 45 is adjusted to correctly position the upper group of rolls with respect to the lower group for a given width of web.

The flattening rolls 26 and 27 are relatively adjustable in a similar manner and the flange-supporting rolls 28 and 29 are adjustable relatively to the rolls 26 and 27, respectively. The upper rolls 26 and 28 are carried by a frame 65, similar to the frame 45, which is actuated by feed screws 66 having worm gear connections 67 with respect to a shaft 68 turned by a hand wheel 69.

It may be desirable to adjust the rolls laterally with respect to each other. Hence, in Fig. 17, I show the rolls 24, 22, 23 and 25 all maintained in fixed position axially whereas the rolls 24', 22', 23' and 25' are axially adjustable. To this end, the rolls 24', 22', 23' and 25' are rotatably mounted on threaded spindles 54, 58, 39 and 35, respectively, the threads of these spindles being engaged by worm wheels 71, 72, 73 and 74, respectively, held in place by supporting members 75 and 76 bolted, respectively, to the adjustable and to the main frames. These worm wheels are engaged, respectively, by worm portions 77, 78, 79 and 80 and the worms are connected to a common actuating shaft 81 having a handwheel 82 connected thereto. By turning the handwheel 82, the threaded spindles supporting the right hand group of rollers in Fig. 17 may be caused to approach or to recede from the left hand group of rollers. This feature is valuable not only in accurately fitting the supporting rollers to the flange members but also to render the apparatus susceptible of use with flange members of varying widths. Since the upper rolls 22' and 24' are carried by a movable frame 45, the worm wheels 71 and 72 necessarily move therewith and it is, therefore, necessary to provide for upper and downward movement of the worms 77 and 78 on the actuating shaft 81. A spline connection 83 is, therefore, provided between the worms 77 and 78 to permit of vertical movement of the worms 77 and 78.

Referring to Figs. 1 to 4, inclusive, it will be apparent that my improved beam structures may be readily fastened together, as indicated in Fig. 1, or may be arranged in side by side relation, as indicated in Figs. 2 and 4, to form a joist or floor construction in a building structure.

Referring to Fig. 1, joined beams are indicated at 84 and 85, the beam at 84 having its end tapered off at the top and the bottom to provide inclined edges 86 on tongues 12 which fit against the outer inclined surfaces of a tongue 12 of the other beam member, at 85. This arrangement serves to hold the beam member, at 84, in place with respect to the beam member, at 85. The webs of the beam members, at 84 and 85, are connected together by angle plates 87 and bolts 88.

Referring to Fig. 2, I show a plurality of my improved beams arranged in side-by-side relation to form the supporting or joist elements of a floor and ceiling construction. The beam members are braced against lateral shifting or turning by the diagonal tension members 89 which are arranged to pass through openings 90 in opposed upper and lower tongues 12 of adjacent beam structures. These tension members are preferably slitted at the ends to provide tongues 91, which, after placing the diagonal members in position may be upset, as indicated in Fig. 3, so that each of the diagonal members serves effectively as a tension brace member to prevent lateral shifting or turning.

In Fig. 2, I show how the nail slot 19 provided by downwardly-extending clutching lips is used. In this view, I show nailing strips 92 for a wooden floor 93 which are held in place with respect to the beam structures by means of nails 94 which are driven through the slots 19 and are effectively clutched or gripped by the lips of the latter to hold the nails in position. In Fig. 4, I show another type of floor or joist construction which is entirely fire-proof in that only fire-proof materials are used, there being no wooden floor nor any wooden nailing strips as shown in Fig. 2.

The tongues 12 of the web member 10 not only render stability to the beam structure, preventing any possible tilting of a flange member with respect to a web member or vice versa, but the tongues leave a triangular clearance space, as indicated in Figs. 2 and 4, which may be utilized for the passage of conduits of various kinds, such as for water, gas, or electric wires.

In Fig. 19, I show a further modified form of my invention consisting of a T-shaped member comprised by a flange member 11ª and a web member 10ª, the flange member having staggered slots 18ª to receive tongues 15ª, which pass through the slots and are bent down externally of the flange member.

From the foregoing, it will be apparent that I have devised a beam structure which is relatively light, which may be made of any suitable dimensions from metal, which is, of course, fire-proof, which is efficient and which may be readily substituted for wooden beams now commonly used in joist constructions.

Having thus described the invention what I claim as new and desire to secure by Letters Patent is:

1. A built-up metallic girder or beam consisting of a flange member and a web member having a portion extending normally with respect to the flange member and having tongues extending alternately in opposite directions with their outer ends secured to the flange member, each of said tongues, at one side thereof, defining opposed acute angles with respect to planes of the normal web portion and of the flange member.

2. A built-up metallic girder or beam consisting of a pair of opposed flange members and a web member having an intermediate portion extending normally of the flange members and having tongues extending from the sides of the intermediate portion and, at each side, extending alternately in opposite directions with the outer ends of the tongues secured to the respective flange members, each of said tongues, at one side thereof, defining opposed acute angles with respect to planes of the intermediate portion and of the flange member to which it is joined.

3. A built-up metallic girder or beam formed from sheet material and consisting of a flange member having two parallel rows of staggered openings and a web member having tongues alternately inclined in opposite directions to extend through the openings and the outer ends of the tongues being upset at the outer face of the flange member to hold the members together.

4. A built-up metallic girder or beam formed from sheet material and consisting of a flange member having an intermediate channel portion defining a channel whose bottom is provided with two parallel rows of staggered openings and a web member having contiguous tongues bent alternately in opposite directions to fit the openings, the outer ends of the tongues being bent toward each other in the channel.

5. A built-up metallic girder or beam formed from sheet material and consisting of a web member having lateral tongues inclined alternately in opposite directions and flange members each having two parallel rows of staggered openings and the openings fitting about the tongues, the outer ends of the tongues being upset to hold the web and flange members together.

6. A built-up metallic girder or beam formed from sheet material and consisting of a web member having lateral tongues inclined alternately in opposite directions, each tongue having an outer tenon, and flange members each having two parallel rows of staggered openings and the openings engaging about the tenons, the ends of the tenons beyond the flange members being upset to hold the flange and web members together.

7. A built-up metallic girder or beam formed from sheet material and consisting of a web member having lateral tongues bent alternately in opposite directions and flange members each of which is provided with two parallel rows of staggered openings and the openings fitting about the outer ends of the tongues, the outer ends of the tongues being upset beyond the flange members to hold the flange and web members together, one or both of said flange members being formed with intermediate slots arranged between parallel rows of openings and which are defined by nail-gripping lips extending toward the web member.

8. A method for the manufacture of a metallic structural member which consists in slitting an elongated plate to provide lateral tongues, in bending the tongues alternately in opposite directions, in forming a flange member with a pair of parallel rows of staggered slots, in placing the flange member in position with the slots engaged over the outer ends of the tongues of the web member, and in upsetting the portions of the tongues extending beyond the flange member to hold the web and flange members together.

9. A process for the manufacture of a metallic structural member which consists in providing an elongated plate having lateral notches, in slitting the plate laterally so that the slits intersect the notches to provide lateral tongues having outer tenons, in bending the tongues alternately in opposite directions, in forming a flange member from plate material with a pair of rows of staggered slots arranged to fit over the tenons, in placing the flange member with the slots arranged about the tenons, and in upsetting the portions of the tenons extending beyond the flange member.

10. The process of making a structural member which consists in punching an elongated plate to provide lateral notches, in slitting the plate so that the slits intersect the notches to provide lateral tongues having outer tenons, in bending the tongues alternately in opposite directions, in forming flange members from plate material, each flange member having a pair of rows of elongated slots to fit the tenons, in placing the flange members in position with the slots thereof fitting over the tenons, and in bending the portions of the tenons extending beyond the flange members down to hold the web and flange members together.

11. A process of fabricating a structural member which consists in shaping sheet metal into channel flange members with intermediate depressions between the flanges of the channels, in punching parallel rows of slots in the depression of each flange member, the slots of the respective rows being staggered with respect to each other, and in providing slits between the rows of slots and which have lip portions extending in the direction of channel flanges, in forming web members from sheet metal with alternately extending tongues with tenons at their outer ends, in placing a pair of channel members in position with their flanges extending toward each other and with their lots engaging about the tenons, and in upsetting the tenons externally of the channel flange members.

12. A process of fabricating a structural member which consists in forming sheet metal flange members each with a pair of parallel rows of slots, the slots of the rows of each member being staggered with respect to each other, in forming a sheet metal web member with laterally extending and alternately inclined tongue members having tenon portions at the outer ends thereof, in placing flange members with the slots thereof engaged about the tenons of a web member, in supporting the assembly of a pair of flange members and a web member on supporting rollers, in passing the assembly between rollers for partially bending over the tenons, and thereafter in passing the assembly with bent-over tenons between flattening rollers to flatten the tenons against the flange members.

13. A process of fabricating a structural member which consists in forming sheet metal flange members each with lateral flanges extending therefrom in a like direction, with an intermediate depressed portion between the flanges and with a pair of parallel rows of slots in the depressed portion, the slots of the rows of each member being staggered with respect to each other, in forming a sheet metal web member with laterally extending and alternately inclined tongue members having tenon portions at the outer ends threof, in placing flange members with the slots thereof engaged about the tenons of a web member and with the lateral flanges and the intermediate depressed portions extending toward each other, in supporting the assembly on rollers which engage the flange members between the flanges and the depressed portions thereof, in passing the assembly while supported on the rollers between bending rollers to partially bend over the tenons, and thereafter in passing the assembly with bent-over tenons and while supported on the supporting rollers between flattening rollers to flatten the tensions into the depressions of the flange members.

In testimony whereof I hereunto affix my signature this 20th day of November, 1924.

CHARLES SCHENCK